United States Patent
Brenner et al.

(10) Patent No.: US 7,654,750 B2
(45) Date of Patent: Feb. 2, 2010

(54) BIDIRECTIONAL OPTICAL FIBER LINK SYSTEMS COMPONENT COUPLERS

(76) Inventors: Mary K. Brenner, 4275 Deerwood La. N., Plymouth, MN (US) 55441; Klein L. Johnson, 2845 Wear Cir., Orono, MN (US) 55356

( * ) Notice: Subject to any disclaimer, the term of this patent is extended or adjusted under 35 U.S.C. 154(b) by 0 days.

(21) Appl. No.: 11/503,513

(22) Filed: Aug. 10, 2006

(65) Prior Publication Data
US 2007/0036493 A1    Feb. 15, 2007

Related U.S. Application Data

(60) Provisional application No. 60/707,082, filed on Aug. 10, 2005.

(51) Int. Cl.
*G02B 6/36* (2006.01)
(52) U.S. Cl. .......................... 385/89; 385/93

(58) Field of Classification Search ............... 385/49, 385/52, 88–94
See application file for complete search history.

(56) References Cited

U.S. PATENT DOCUMENTS

| | | | |
|---|---|---|---|
| 5,997,185 A * | 12/1999 | Kropp | 385/89 |
| 6,243,508 B1 * | 6/2001 | Jewell et al. | 385/14 |
| 6,454,467 B1 * | 9/2002 | Ishihara et al. | 385/88 |
| 6,694,074 B2 * | 2/2004 | Schunk | 385/33 |
| 6,898,219 B2 * | 5/2005 | Malone et al. | 372/29.02 |
| 7,121,741 B2 * | 10/2006 | Furuta et al. | 385/89 |
| 2006/0051033 A1 * | 3/2006 | Tabata et al. | 385/93 |

* cited by examiner

*Primary Examiner*—Kevin S Wood
(74) *Attorney, Agent, or Firm*—Kinney & Lange, P.A.

(57) ABSTRACT

A coupler with an optical element for passing signals between a signaling device and an optical fiber in one direction along a fiber axis and away from the fiber axis in the opposite direction. A molded housing with the optical element houses the signaling device with the optical fiber aligned thereto.

20 Claims, 14 Drawing Sheets

BIDIRECTIONAL OPTICAL FIBER LINK SYSTEMS COMPONENT COUPLERS

CROSS-REFERENCE TO RELATED APPLICATION

This application claims the benefit of Provisional Application No. 60/707,082 filed Aug. 10, 2005 for "BIDIRECTIONAL OPTICAL FIBER LINK SYSTEMS COMPONENTS COUPLERS".

BACKGROUND OF THE INVENTION

The present invention relates to transmission of electromagnetic radiation over optical fibers linking transmitter and receiver arrangements in the linking system and, more particularly, to the mating arrangements for components provided in such linking systems.

Fiber optic links are now widely implemented for communications and sensing systems. A block diagram representation of a typical fiber optic link system is shown in FIG. 1 having a driving circuit, 1, an optical emitter, 2, that are typically housed together on a support, 3, which are coupled to an optical fiber, 4. At the other end of optical fiber 4, that end is coupled to a photodetector, 5, and a receiving circuit, 6, that amplifies the signal received thereby from photodetector 5. Similarly, photodetector 5 and receiving circuit 6 are typically housed together on a second support, 7, using typical electronic device systems housing, or "packaging" techniques.

The most difficult requirements to be met in implementing the link system shown in FIG. 1 come from the need to couple light from optical emitter 2 into optical fiber 4, and to direct the light emerging from that fiber onto photodetector 5. The light carrying diameter of fiber 4 may range from approximately 8 μm for a glass fiber that supports propagation of a single electromagnetic radiation mode, to approximately 50 μm for a multimode glass fiber, to as much as 1 mm for a plastic fiber. The smaller diameter glass fiber, especially, requires proper optical lens design to efficiently couple light into the fiber, and precise alignment as well.

The block diagram of FIG. 1 illustrates a unidirectional link system, i.e. the information is transferred in one direction in being carried by the transmitted electromagnetic radiation. In communications applications, information transfer in the return direction is frequently addressed by a replication of this link system of FIG. 1, except that the information transfer is directed in the opposite direction.

However, there are situations in which there is a desire to be able to transfer information through a single optical fiber in both directions. For example, transceivers located on the edge of a printed circuit board based system are often limited by the amount of space available for connections thereto at the edge of the board. Bidirectional communication over a fiber would decrease the number of fibers required, and potentially double the number of bidirectional connections that fit in the limited space on the edge of that board. Alternatively, for longer distance connections, the cost of the optical fiber used becomes substantial. Reducing the number of fibers required by a factor of two creates a substantial cost reduction.

Further situations involving bidirectional radiations transmissions in a single optical fiber include optical sensing applications which often rely upon sending an electromagnetic radiation signal along an optical fiber that is subsequently modified by the interaction thereof with the material corresponding to the condition to be sensed, and then this modified radiation signal is reflected back along the same fiber for detection. Finally, monitoring of the physical conditions of the fiber optic link can be accomplished by means of optical time domain reflectometry (OTDR) methods.

In OTDR techniques, electromagnetic radiation transmitted along the optical fiber is backscattered or reflected at locations on the optical path where it encounters alterations in the index of refraction of this medium, and this radiation creates a return signal that is monitored over time. Such techniques provide quantitative information about the losses of radiation power occurring on the optical path in the fiber, and the losses thereof occurring at discrete locations along this optical path such as where the fiber is mated with a signal transfer connector.

FIG. 2 shows a graph having a plot demonstrating samples of the kinds of data that can be collected by these techniques. In this figure, the return signal radiation power versus time raw data has been translated into a plot of the return signal radiation power versus distance along the optical path based upon the speed of light in that medium. This return signal was acquired from a fiber optic link having two optical fibers of different lengths joined together with a signal transfer connector.

The plot shown of the resulting return signal has two line segment portions therein, 8 and 8', each with a corresponding slope differing from that of the other, with a sharply changing plot portion, 9, (including an inflection point) between them involving air-fiber Fresnel reflection showing a discontinuity in the radiation backscattered that represents the result of the connector being used to join the fiber segments. Slope 8 of −9 db/km corresponds to a 100 m length step index fiber and slope 8' of −63 db/km corresponds to a 200 meter length plastic clad silica fiber. The slopes of these two line segment plot portions allow estimating radiation power losses of the corresponding fibers. The magnitude of the plot portion change at the discontinuity allows estimating the radiation power loss occurring at the connection between the two fibers.

In long distance telecommunications systems based on fiber optic link systems, evaluating the performance and integrity of fiber optic links has usually been accomplished through use of optical time domain reflectometry. The long distances involved make very valuable the ability to identify remote disruption issues occurring along the optical path in the optical fiber or fibers used therein and the various junctions where joinings thereof occur and where also various signal taps provided. These issues can include fiber breaks, excessive fiber bends, and dirty or damaged fiber connectors. The ability to pinpoint the location of any such problems has significant benefits in the costs incurred in corresponding troubleshootings and repairs.

On the other hand, in shorter range data communications systems that are also based on fiber optic link systems where the links are typically on the order of 10 meters to 10 kilometers, the breakpoints in cost-benefit trade-offs have involved troubleshooting techniques having lower cost points. However, the "wiring closets", or spaces where network equipment is located, are often cramped and stuffed to capacity with such equipment which could be alleviated to an extent by the use of bidirectional transmissions on individual optical fibers to thereby reduce the number of them used and the associated connectors and the like. The increasing density of components and their interconnections occurring in more recently provided ones of such wiring cabinets raises the costs of any troubleshooting undertaken with respect thereto.

Other fiber optic link systems uses have emerged, such as the implementation of fiber optical networks on military aircraft or vehicles, where the reliability of the network is essential. Military avionics environments typically pose more stringent requirements than commercial data transfer environments with regard to the integrity of the link and the ability to detect conditions that compromise that integrity. Gaining access to the various points of a link in a military aircraft, for instance, can be very difficult. Furthermore, there is a strong desire is to perform fairly thorough preventive maintenance procedures on such aircraft in between missions, and to perform them efficiently to permit the aircraft to be available for the next mission quickly. A high premium on personnel safety and mission success requires that the correct operation of a data communication link be of prime importance. Therefore, techniques that facilitate diagnosing problems in fiber optic communication links easily and quickly are much desired, and which can be significantly aided by the use of bidirectional transmissions on individual optical fibers to thereby reduce the number of them used and the associated supporting components.

Hence, there are numerous reasons for incorporating bidirectional signal transfer capability for individual optical fibers. This requires coupling electromagnetic radiation, or light, in and out of the individual optical fiber with an acceptably high coupling efficiency at an acceptable cost.

A significant factor in coupling such light in and out of individual optical fibers are the characteristics of the optoelectronic devices used in providing and detecting such light. The configurations of the optoelectronic device structures (structure top surface emitting or detecting arrangements, or structure side surface emitting or detecting arrangements), the symmetry and divergence of the light beams emitted from the light source, and the size of the detecting surface area of a photodetector are all necessary to be considered in selecting housing structures or packages to contain such optoelectronic devices and provide satisfactory optical coupling between them and the corresponding optical fiber.

FIG. 3 schematically illustrates some common configurations for semiconductor material chips capable of selectively providing electromagnetic radiation emissions as optical communication sources shown as projected above the semiconductor material wafers from the location therein at which they are fabricated using monolithic integrated circuit fabrication techniques. Almost all such optical communication sources used in long distance telecommunications fiber optics links are edge-emitting lasers (EELs). In these devices the light emissions come from the edge of the chip and tend to be asymmetric about a central beam direction axis with a large divergence (10° by 40°) from that axis in at least one plane therethrough. Light emitting diodes (LEDs) are surface emitters typically with a divergence equal to a full hemisphere and are used as optical communication sources only for relatively low data rate fiber optic links, and are typically being used only with plastic optical fibers in links provided in automobiles or industrial control networks.

Vertical cavity surface emitting lasers (VCSELs) are being used as optical communication sources for shorter distance data communication systems based on fiber optic link systems, that is, for link lengths shorter than 500 meters. They have the advantage of providing light emissions from a major surface of the chip such that these emissions form symmetric, low divergence beams. These lasers provide a combination of good performance at a reasonable cost for these shorter distance links, but typically do not provide sufficient performance for long distance telecommunication fiber optic links due to the mismatch between the laser emission wavelength and the optical fiber best transmission wavelengths (850 nm versus the desired 1310 nm or 1550 nm) and the wider laser emission spectral width as compared to the fiber transmission spectral widths at these wavelengths. However, longer wavelength VCSELs are currently under development.

The difficulties in coupling light from an optical fiber into photodetectors are typically less severe. Most photodetector semiconductor material chips detect light at a major surface therein, although a few special application detectors may require light to be coupled into the edge of the chip. Most significantly, the size of the active light detection region is usually related to the rapidity of the response of the device to impinging light, and so photodetectors for higher data rate links must correspondingly be smaller. This results in requiring more accurate alignment between fiber and that smaller photodetector to achieve a satisfactory optical coupling.

Furthermore, there is a desire to minimize the interaction, or "cross-talk", between electromagnetic radiation transmitted in one direction through the link optical fiber and any aspects involving radiation propagation in the opposite direction in that fiber. For instance, reflected light from the fiber directed back into the aperture of the optical emitter can cause noise in that optical emitter thus degrading the information carrying capacity of the link.

Housings or packages are available for components used in coupling to optical fibers in bidirectional fiber optic links, including those that incorporate OTDR capability into a fiber optic transceiver, but they tend to be expensive, bulky and designed for use with EELs. For instance, planar lightwave circuits (PLCs) can be used to provide the input from the laser to an optical fiber and to also split off part of the return signal to a photodetector. PLCs based upon both silica material waveguides, and polymer material waveguides, have been applied in bidirectional fiber optic links for fiber-to-the-home (FTTH) signal distribution systems.

One arrangement for bidirectional coupling on fiber optic links using electromagnetic radiation transmissions of different wavelengths in each direction in an optical fiber is shown in FIG. 4. FIG. 4A is a schematic top view of the assembly for this arrangement. The electromagnetic radiation output from an edge-emitting laser diode, 2', on a substrate, 3',7', is coupled into an optical waveguide, 4', formed in or on that substrate. A spectral filter, 4", reflects radiation at the wavelength of the laser and couples it into another waveguide segment, 4''', in or on that substrate that is optically coupled to the transmission optical fiber 4. In the reverse direction along optical fiber 4, electromagnetic radiation transmitted from the opposite end of the optical fiber at a different wavelength is coupled from that fiber to that same optical waveguide 4'''. However, in this direction the wavelength of the radiation is such that it is transmitted by spectral filter 4" into a photodetector, 5', also provided on the substrate.

A side view in cross section of a portion of the assembly is shown in greater detail in FIG. 4B. Spectral filter 4" is positioned in a 200 μm wide groove in substrate 3',7', typically of silicon. A 45° angle surface mirror across from this filter at a clad layer on the top of the substrate is used to reflect the incoming radiation upward to thereby couple it into the detecting area of a major separate parts and precise optical alignments between them, and the wavelengths of the radiations propagating in opposite directions in the fiber must be different.

A second arrangement for bidirectional coupling on fiber optic links is illustrated in FIG. 5 again using electromagnetic radiation transmissions of different wavelengths in each direction. In this arrangement, radiation at two wavelengths is propagated in one direction along the optical fiber, and radiation at a third wavelength is propagated in the opposite direction. There are two waveguide structure substrates, 3", 7", and 3''', 7''', one provided at each of the opposite ends of the link with link optical fiber 4 being coupled to each. Each of these waveguide structure substrates has a corresponding one of two fiber interface waveguide portions, 4'''' and 4ᵛ, on or in the substrate portion thereof coupled to a corresponding end of fiber 4, and extends in its waveguide structure substrate away from that fiber to a junction point at which it is split into three waveguide branches to direct radiation from a laser or lasers at one link end through the fiber to a photodetector or photodetectors at the opposite link end. Outgoing radiation in a waveguide branch from a laser, 2'', coupled thereto through a glass end plate in the corresponding waveguide structure substrate, is transmitted through the junction to the fiber interface waveguide portion that is coupled to fiber 4 with power losses being suffered at the junction. Incoming radiation is coupled from fiber 4 to the fiber interface waveguide portion and on to the junction where it is split into all three waveguide branches to be transmitted therethrough, and through the corresponding glass end plate in the waveguide structure substrate, to a photodetector 5'', or photodetectors but a spectral filter, 4ᵛⁱ, is again used to prevent such radiation from reaching any laser 2''. This arrangement can use either edge emitting or surface emitting devices, and either edge detecting or surface detecting devices, with each such optoelectronic device aligned to the appropriate waveguide branch. Once again, this arrangement requires many piece parts with precise alignment requirements, and radiation of different wavelengths for transmission in opposite directions in the fiber.

A third arrangement that does allow radiation of the same wavelength to be used in both directions in the link optical fiber involves using the same optoelectronic device as both an optical source and a photodetector. In particular, the use of a VCSEL both as a laser and as a photodetector has been demonstrated based on the active region of the VCSEL serving as a resonant cavity photodetector when reverse biased. Such devices can be coupled directly to the optical fiber in the link without requiring any additional waveguide interfaces. However, use of a VCSEL both as a laser and as a photodetector requires some (often unacceptable) compromises to be made in the device structure resulting in either an inferior laser, an inferior photodetector, or both. Thus, there is a desire for a bidirectional fiber optic coupler for coupling link fibers to corresponding transceivers.

BRIEF SUMMARY OF THE INVENTION

The present invention provides a coupler for coupling to one another an optical fiber and a signaling device to allow signals to pass between them by allowing a radiation emitter to send signals along an axis of the fiber and to receive signals from the fiber that are spread away from the fiber axis by the optical element sufficiently to substantially avoid impinging on the emitter. The optical element can be a molded part also comprising a housing structure that houses the signaling device and that aligns it with the optical fiber.

DETAILED DESCRIPTION

Figure 1:
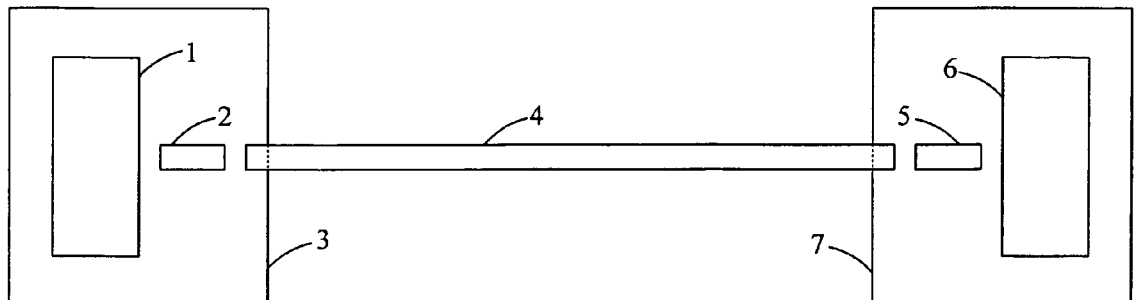
FIG. 1 shows a general representation of a fiber optic link in block diagram form.
Figure 2:
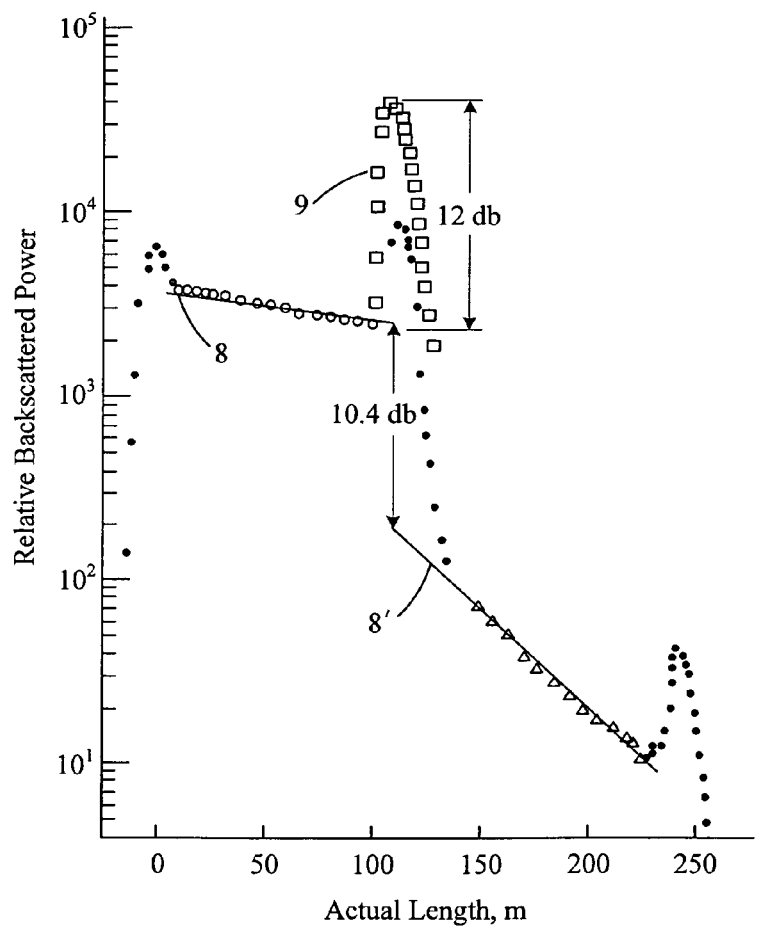
FIG. 2 shows a graph with a plot of return signal power in a fiber optic link.
Figure 3:
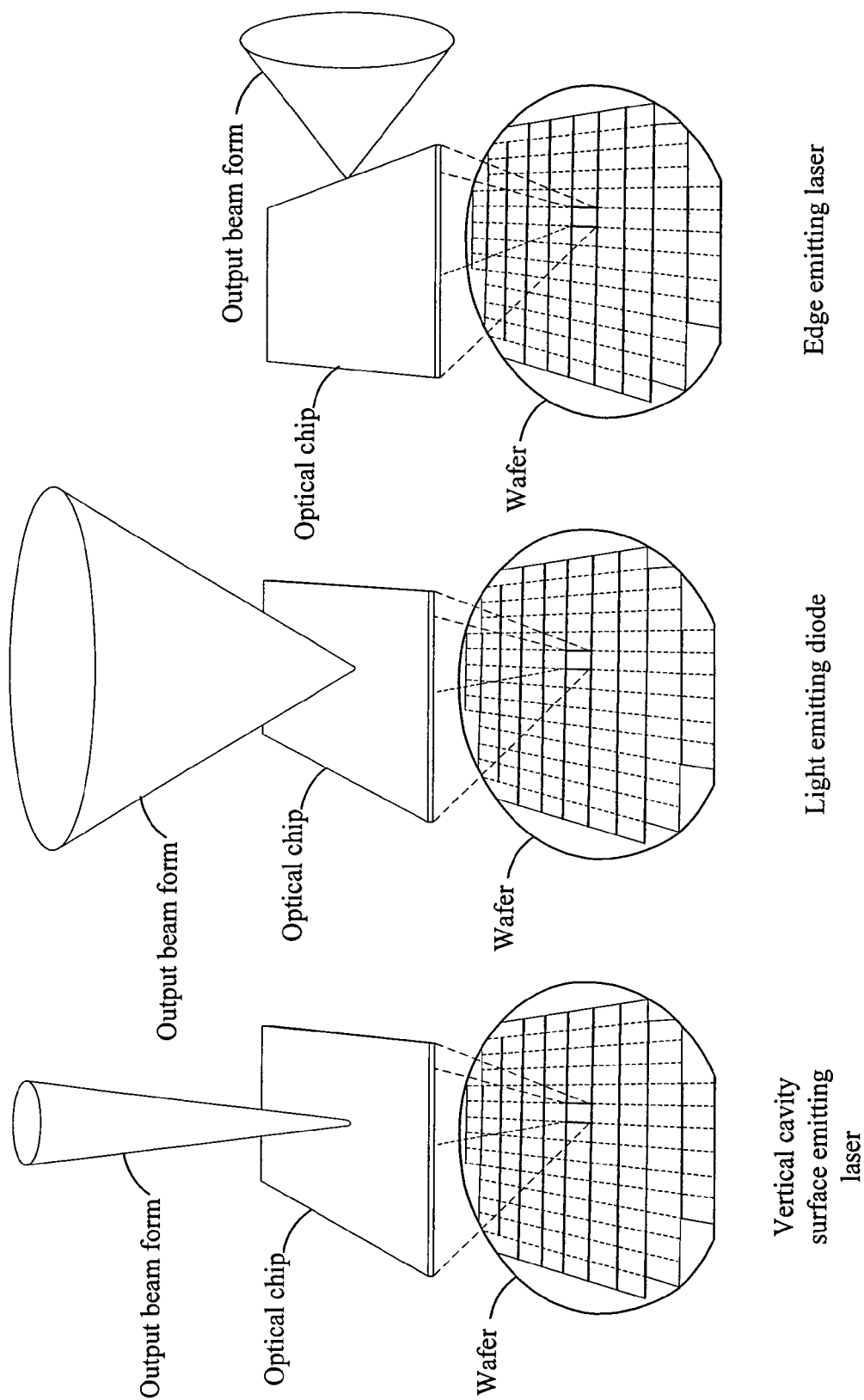
FIG. 3 shows a schematic representation of alternative forms of optical source devices.
Figure 4A:
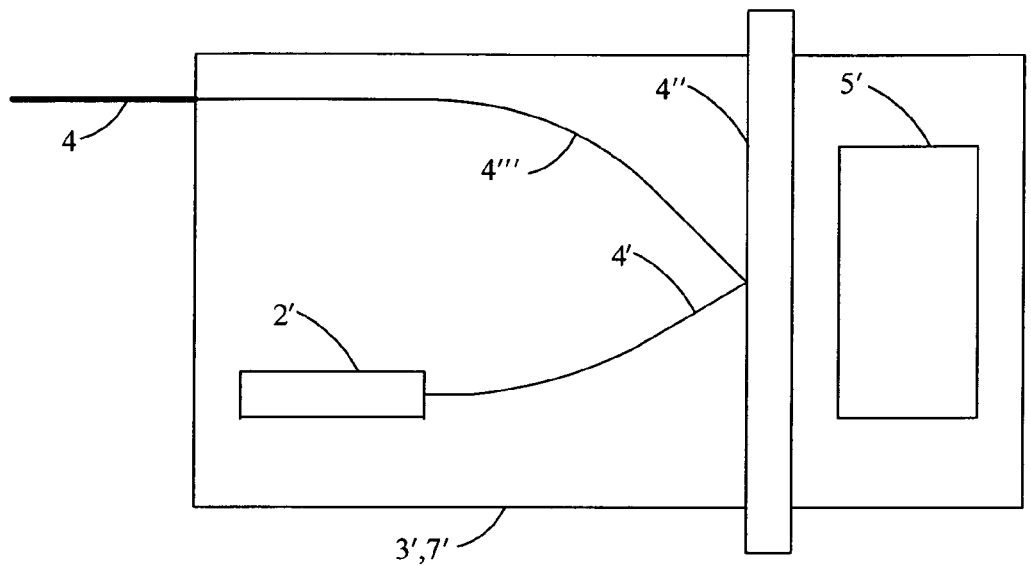
FIGS. 4A and 4B show alternative views of a bidirectional transmission fiber optic link.
Figure 4B:
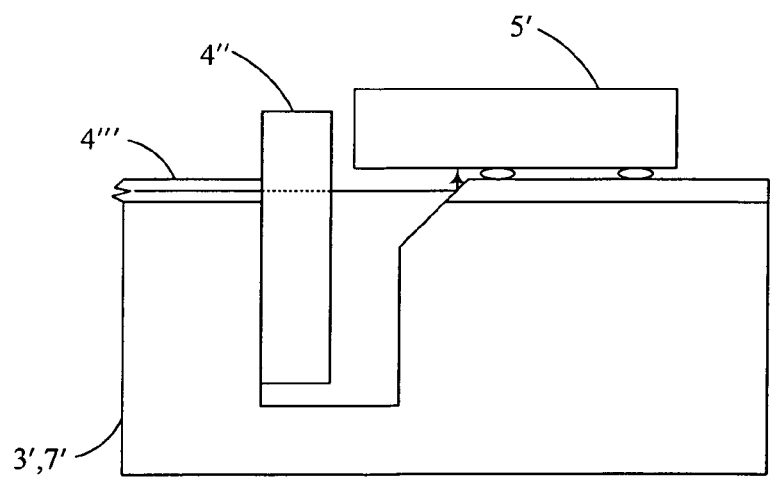
Figure 5:
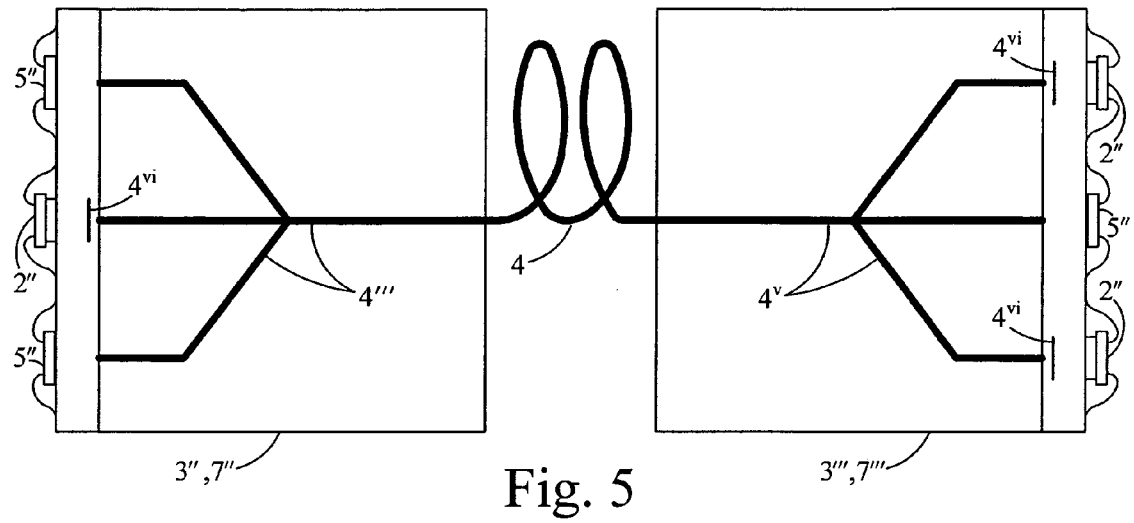
FIG. 5 shows a view of an alternative bidirectional transmission fiber optic link.
Figure 6:
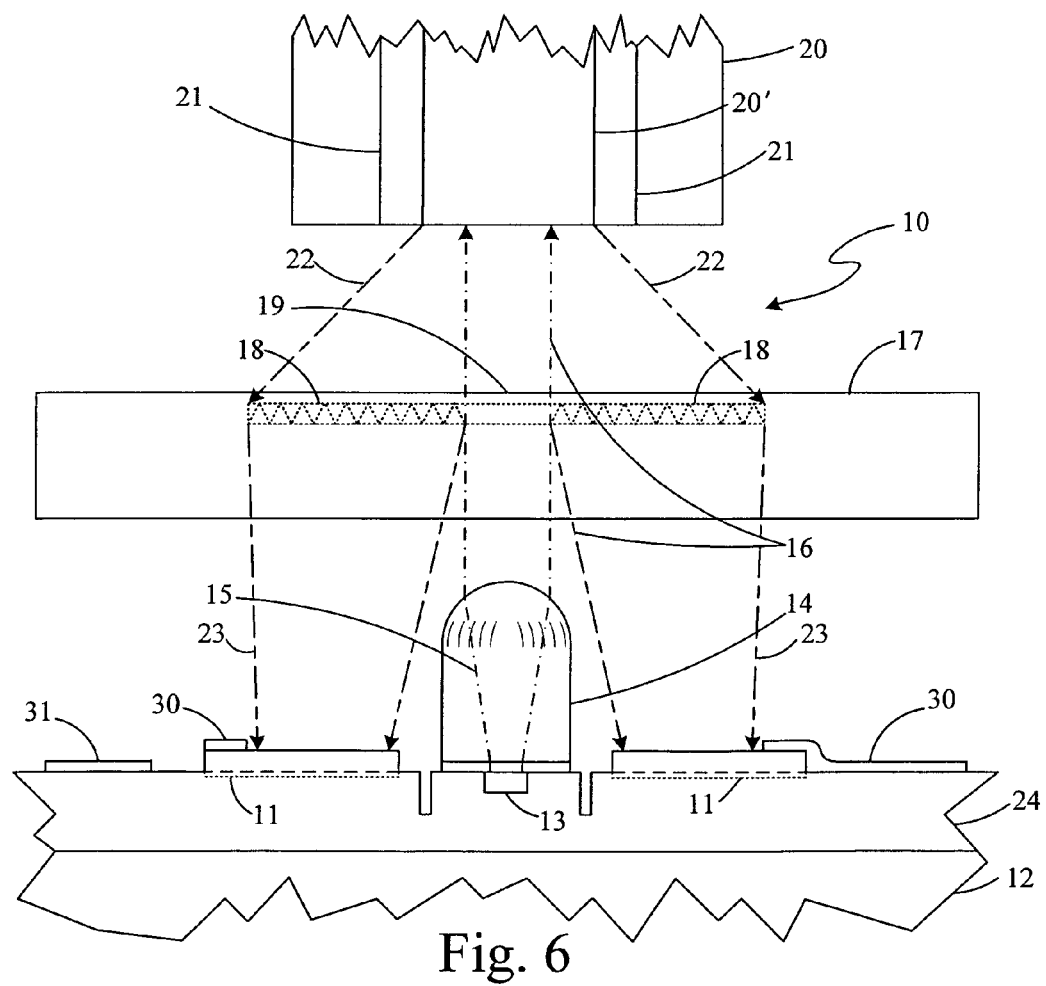
FIG. 6 shows a side view of a schematic representation of an embodiment of a fiber optic link coupler of the present invention.

An embodiment of the present invention as a combined laser and photodetector transceiver optical portion structure, 10, is shown schematically in a side view in FIG. 6. A photodetector, 11, is integrally formed at a major surface of an optoelectronic monolithic integrated circuit chip, 12, that also has a vertical cavity surface emitting laser (VCSEL), 13, integrally formed at that surface such that photodetector 11 partially surrounds VCSEL 13 at that surface. Photodetector 11 can alternatively be a p-i-n photodiode, an MSM (metal-semiconductor-metal) device, an avalanche photodiode, or a resonant cavity photodiode.

Also formed on optoelectronic chip 12 is a collimating lens, 14, that covers VCSEL 13 but leaves uncovered the active radiation detecting area in the major surface of photodetector 11. Collimating lens 14 redirects the initial radiation beam portion, 15, emitted from VCSEL 13, a beam portion that diverges as emitted, into a collimated or even somewhat converging beam portion, 16.

A transparent transmission structure, 17, is positioned above optoelectronic chip 2 across from photodetector 11 and VCSEL 13. Transmission structure 17 has an annular upper surface area at a region therein that contains a transmission diffractive grating, 18, which substantially is not impinged upon by outgoing beam portion 16. In addition, transmission structure 17 also has a centrally located flat upper surface area, 19, within the annular upper surface associated with grating 18 that allows collimated or converging beam portion 16 from VCSEL 13 to pass therethrough without affecting its direction or degree of collimation or convergence. Beam portion 16 from VCSEL 13 is then coupled into an optical fiber, 20, at its core 20' to propagate along that fiber away from structure 10. Fiber 20 also possesses a cladding layer, 21, surrounding fiber core 20'.

Radiation propagating in the opposite direction along fiber 20 to structure 10 emerges as an optical beam, 22, from the fiber 20 with a divergence that is determined by the numerical aperture of that fiber with beam 22 having its outline represented by downward and outward pointing arrows in FIG. 6. This numerical aperture is such that a portion of beam 22 reaches diffraction grating 18 in transparent transmission structure 17. Grating 18 redirects the portion of beam 22 reaching it to a converging beam portion, 23, directed onto photodetector 11 in the optoelectronic chip 12.

Figure 7A:
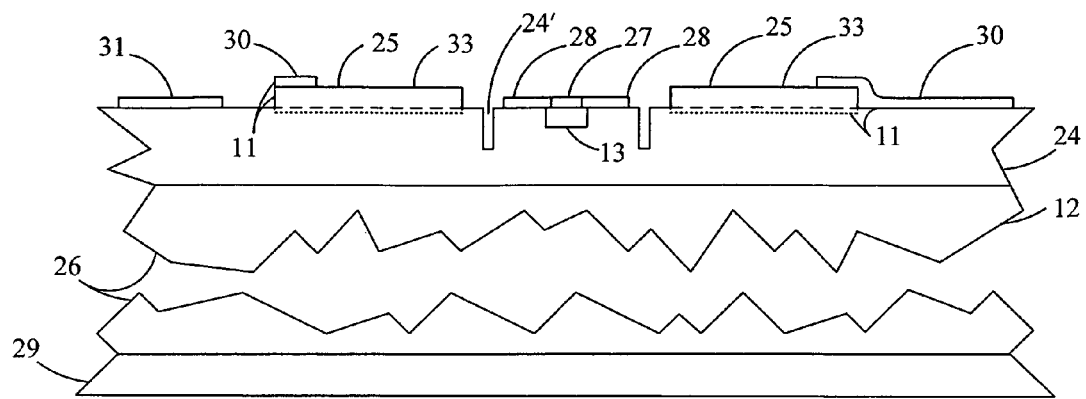
FIGS. 7A and 7B show side and top views of a schematic representation of a portion of the embodiment shown in FIG. 6.

Optoelectronic chip 12 containing both radiation emitter 13 and photodetector 11 is shown in greater detail in FIGS. 7A and B. FIG. 7A provides a layer diagram of chip 12 shown in a side view having the various layers designated there to give an indication of structure, but not a true cross section view, in that many dimensions there are exaggerated or reduced relative to one another for purposes of clarity. An epitaxial layer, 24, required for VCSEL radiation emitter 13 is provided about which there is further provided an isolation trench, 24', in layer 24, and on which another epitaxial layer, 25, required for photodetector 11, is provided. Epitaxial layer 24 is formed on a major surface of a single crystal wafer substrate, 26, which can be formed of GaAs or InP. An emission aperture, 27, of optical emitter 13 is surrounded by a metallzation contact ring, 28, as an electrical contact therewith. The other electrical contact to this emitter is provided by a bottom metallization contact, 29, that is provided on the bottom of substrate 26. Electrical contacts are provided to photodetector 11 through two metallization contacts, 30 and 31.

Figure 7B:
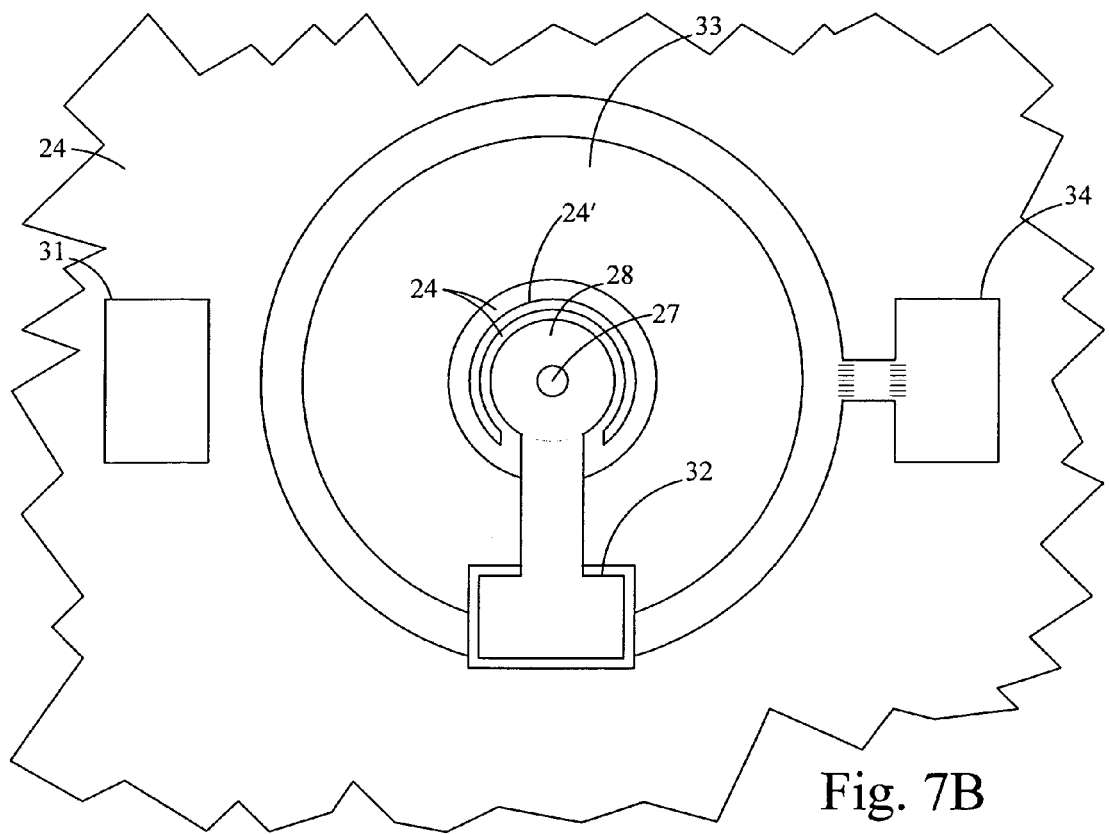

A top view of optoelectronic chip 12 is shown in FIG. 7B. In this view one can see that emitting aperture 27 of optical emitter 13 is surrounded by metal contact ring 28 which is connected to a metallization bond pad, 32. The exposed detecting area, 33, of the remaining portion of epitaxial layer 25 forming part of photodetector 11 is electrically connected to metal contact 30 which is also connected to a metal bond pad, 34. Metallization contact and bond pad 31 provides the second electrical contact to photodetector 11.

Figure 8:
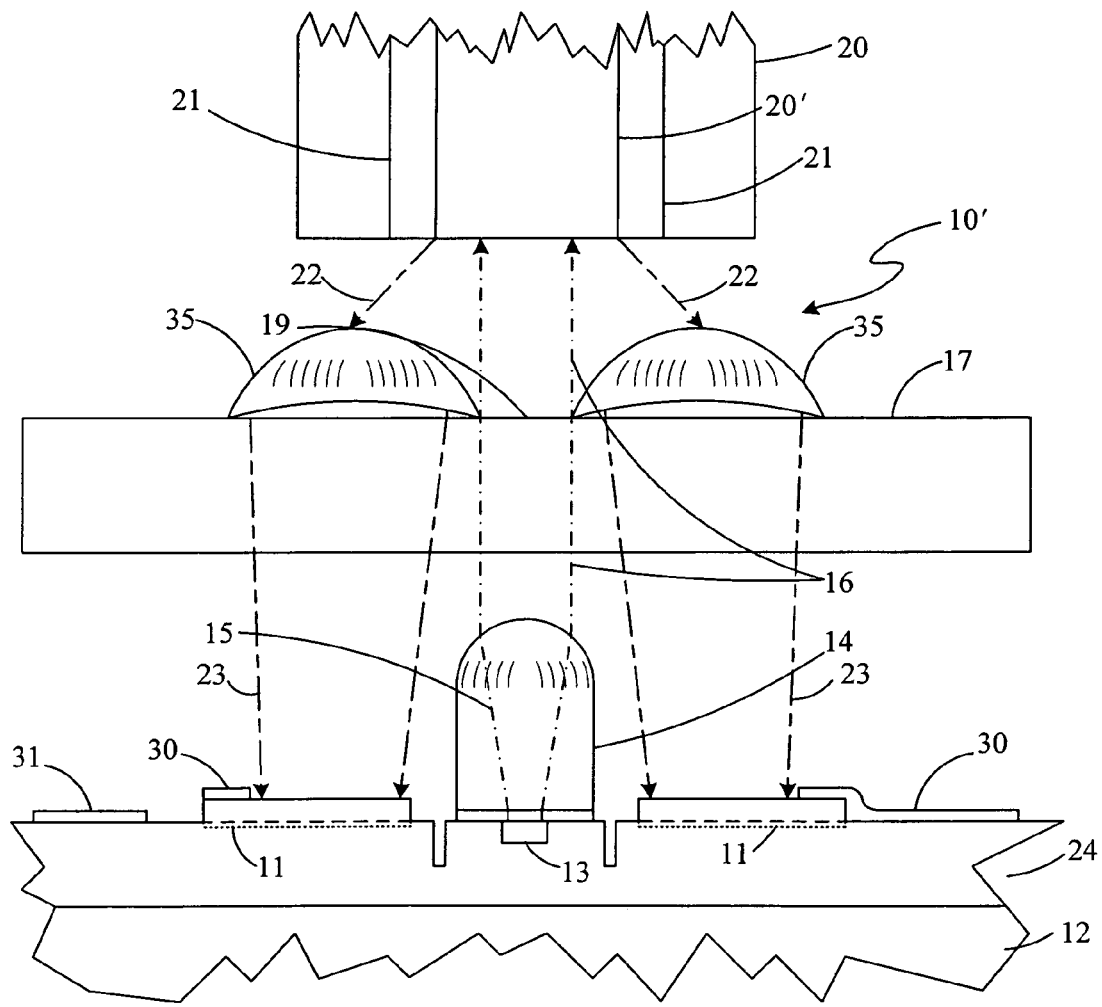
FIG. 8 shows a side view of a schematic representation of an alternative embodiment of a fiber optic link coupler of the present invention.

FIG. 8 shows schematically in a side view an alternative embodiment of the present invention designated here as 10' where the same numerical designations have been used as were used in FIG. 6 for similar structural features and beam representations that are present in each transceiver optical portion. In this transceiver optical portion structure, diffraction grating 18, provided in transparent transmission structure 17 in FIG. 6, has been replaced with an annular refractive lens, 35, centrally positioned on the upper surface of transmission structure 17 that will reduce the angle of diverging optical beam 22 exiting optical fiber 20 in redirecting it onto photodetector 11.

Figure 9:
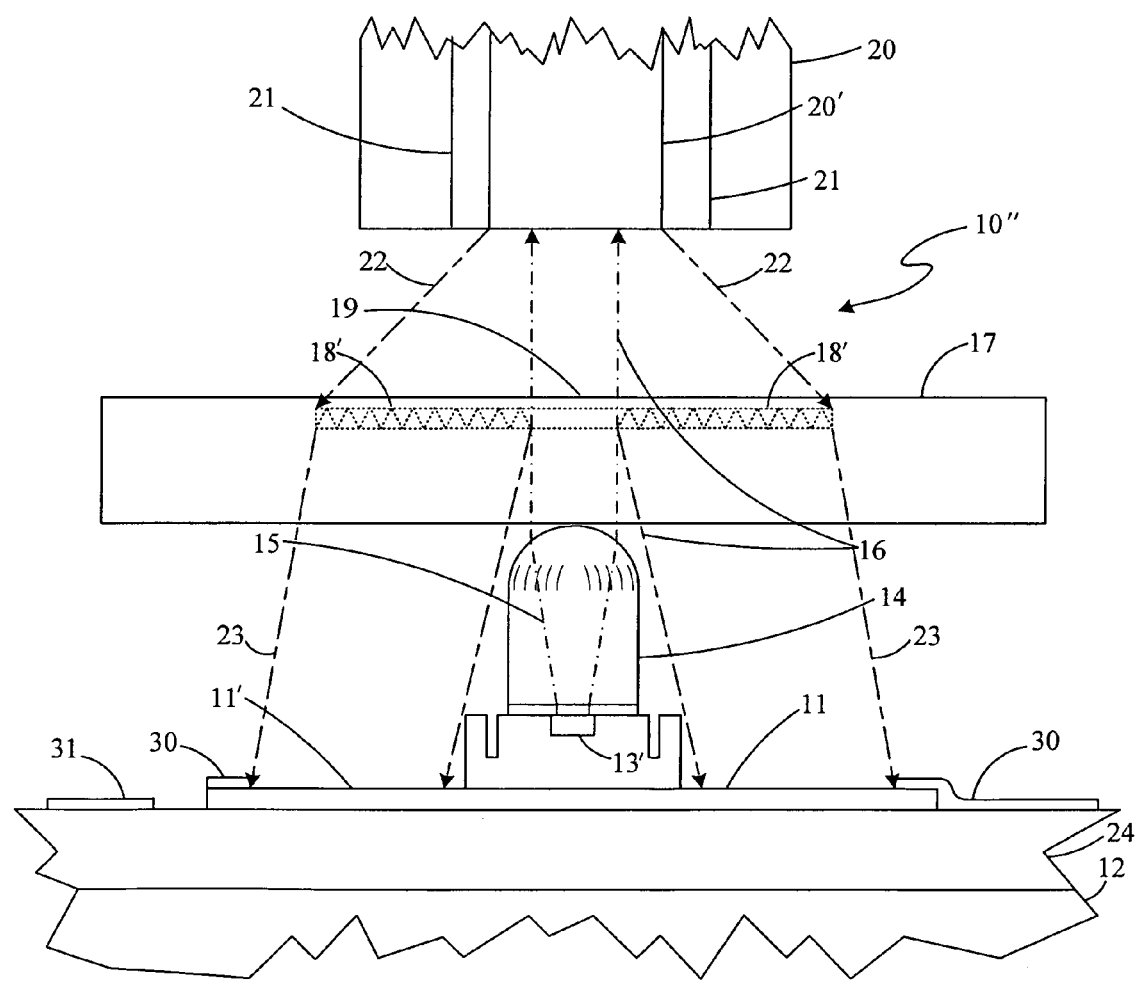
FIG. 9 shows a side view of a schematic representation of a further alternative embodiment of a fiber optic link coupler of the present invention.

FIG. 9 is a further alternative for the present invention providing a side view of a transceiver optical portion, 10', in which optical emitter 13 and photodetector 11 of FIGS. 6 and 8 are formed in separate optoelectronic chips. Again, the same numerical designations have been used as were used in FIGS. 6 and 8 for similar structural features and beam representations that are present in each transceiver optical portion. An optoelectronic chip containing a VCSEL as an optical emitter, 13', is stacked on top of another optoelectronic chip containing a photodetector, 11', fabricated on a substrate, 26'. Since optical emitter 13' is not fabricated on substrate 26' here, substrate 26' can be provided as any of the semiconductor materials Si, GaAs, or InP. Also here, a modified diffraction grating, 18', is used that increases the angle of divergence of beam 22 so that it is more directed away from the optical emitter 13' to thereby result in a greater fraction of the total light in beam 22 reaching photodetector 11' in redirected beam portion 23.

Figure 10:
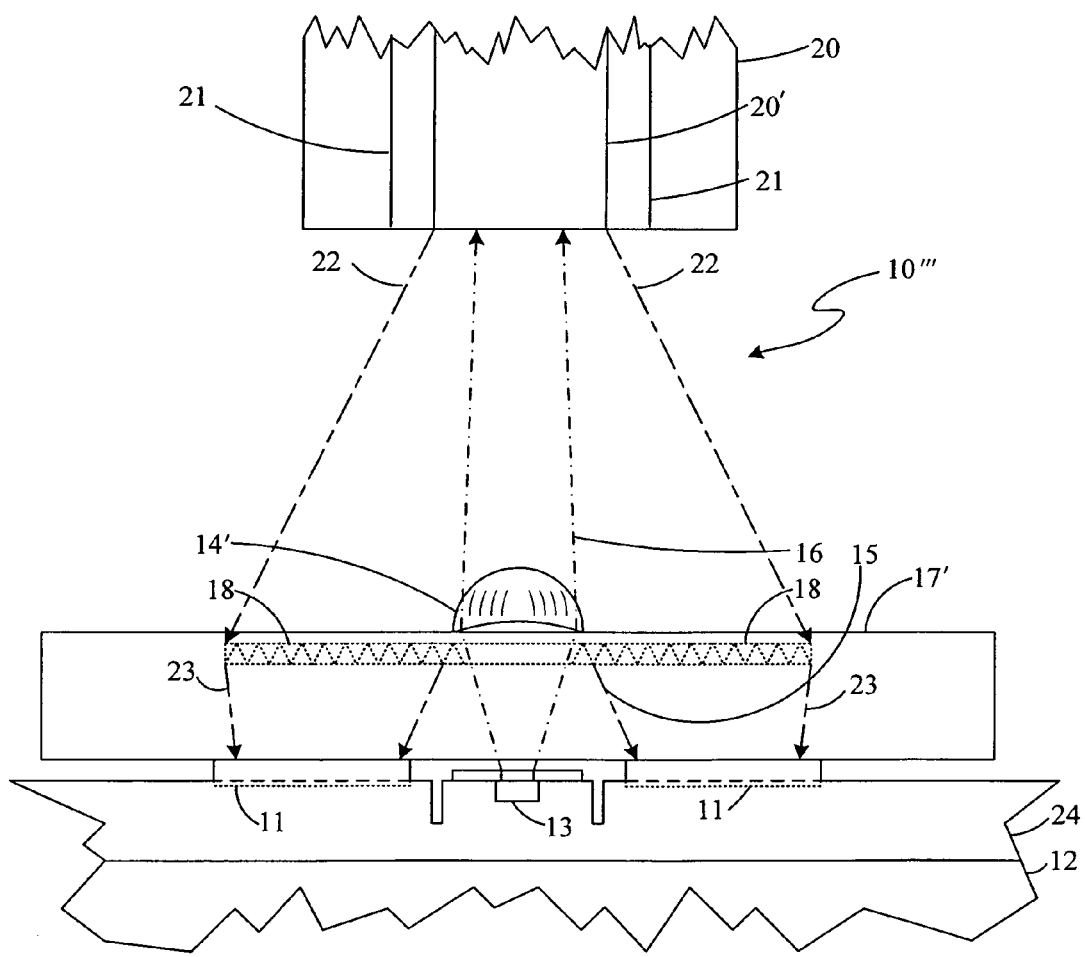
FIG. 10 shows a side view of a schematic representation of yet another alternative embodiment of a fiber optic link coupler of the present invention.

Yet another alternative for the present invention involving transceiver optical portions is shown in FIG. 10 with the designation of 10''' where spaced apart transparent transmission structure 17 of FIGS. 6, 8 and 9 is instead directly on the major operating device surface of optoelectronic chip 12 as transparent transmission structure 17'. Diffraction grating 18, for redirecting incoming beam 22 from optical fiber 20 into more laterally spread beam portion 23, is integrated onto transmission structure 17'. So too is a lens, 14', integrated onto transmission structure 17' where it redirects diverging outgoing beam 15 from optical emitter 13 into a collimated or converging beam 16 instead of lens 14 being directly fabricated on optical emitter 13 as shown in FIGS. 6, 8 and 9.

Figure 11:
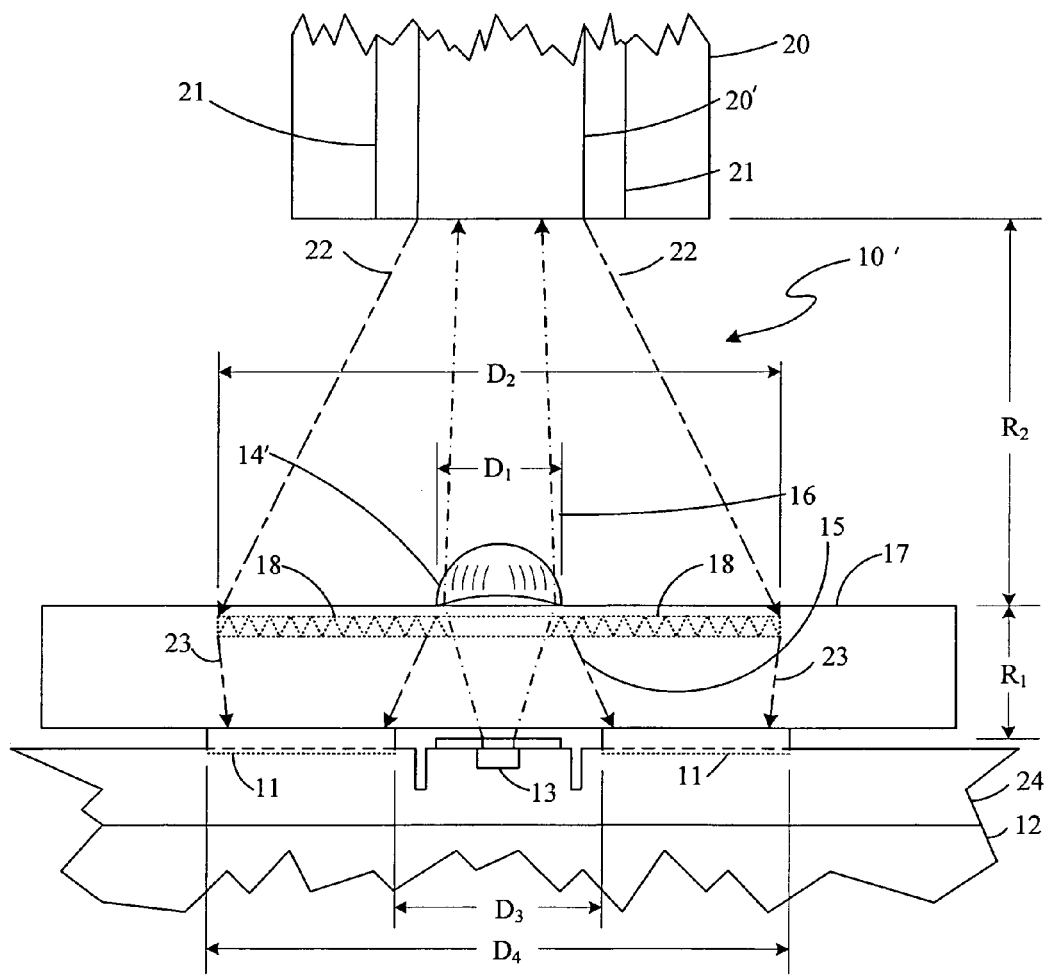
FIG. 11 shows a side view of a schematic representation of an embodiment of a fiber optic link coupler of the present invention marking selected spatial relationships.
Figure 12:
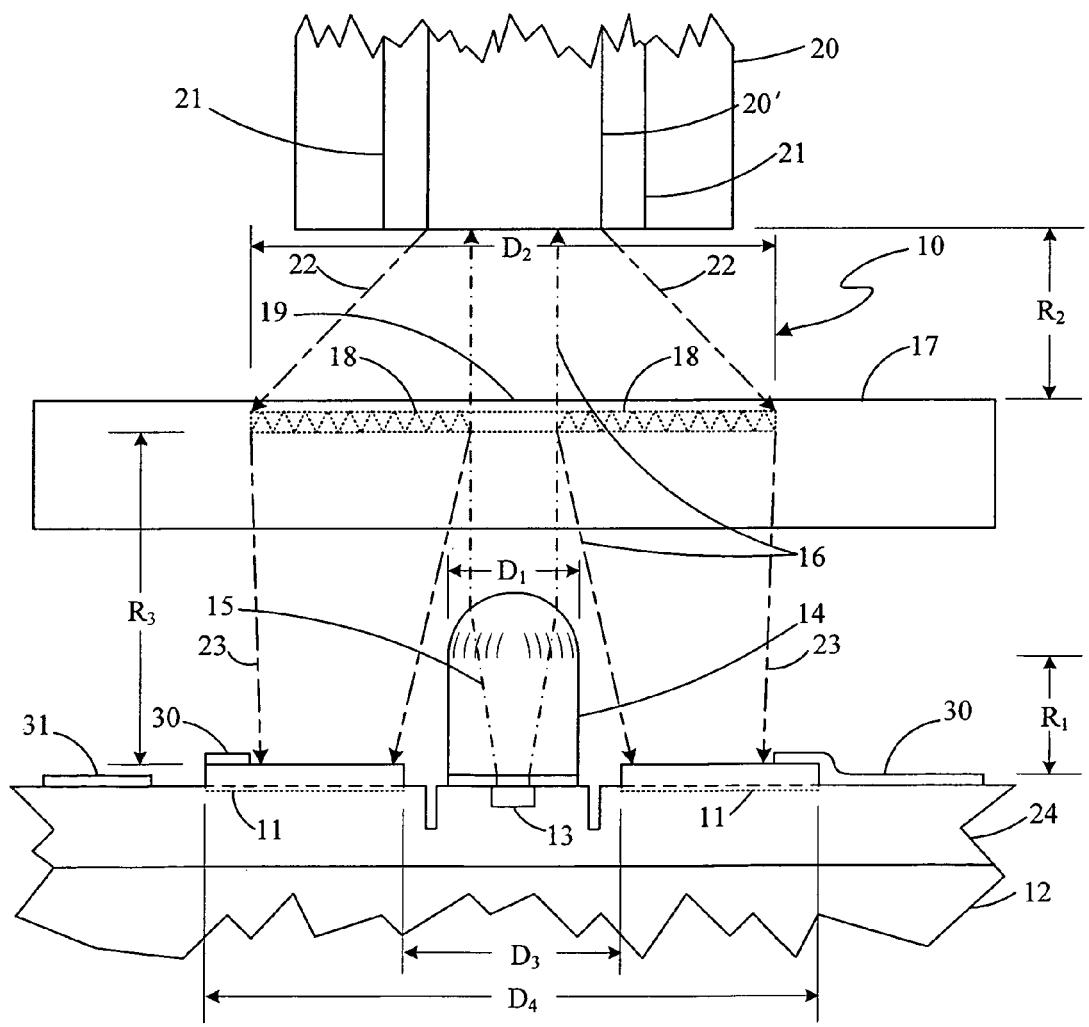
FIG. 12 shows a side view of a schematic representation of another embodiment of a fiber optic link coupler of the present invention marking selected spatial relationships.

FIG. 11 is essentially a repeat, though abbreviated, of FIG. 10 showing some of the key variables and parameters affecting the performance of the transceiver optical portions of the present invention for use in a bidirectional fiber optic link system. The distance from emission aperture 27 of optical emitter 13 to lens 14' is designated as $R_1$. The distance from the end of optical fiber 20 to the transparent transmission structure 17' containing diffraction grating 18 (or the annular refractive lens 35 in FIG. 8) is designated as $R_2$. The maximum diameter of emitted beam 15 at lens 14' is designated by $D_1$. The maximum diameter at the plane of diffraction grating 18 of diverging beam 22 exiting optical fiber 20 (or at refractive lens 35 in FIG. 8) is designated by $D_2$. The diameter of the partial circle formed by the inner edges of detecting area 33 of photodetector 11 is designated $D_3$, and the diameter of the partial circle formed by the outer edges of detecting area 33 of photodetector 11 is designated $D_4$ FIG. 12 is similar to FIG. 11 to again show key variables and parameters but is essentially a repeat, though abbreviated, of FIG. 6 in having transparent transmission structure 17 spaced apart from optoelectronic chip 12. As a result, diffraction grating 18 (or refractive lens 35 in FIG. 8) for redirecting incoming beam 22 from optical fiber 20 is on a different plane than lens 14. Therefore, there is another distance variable of interest in this figure, $R_3$, which is the distance from diffraction grating 18 (or refractive lens 35 in FIG. 8) and photodetector 11.

FIG. 13 illustrates how the transceiver optical portions of present invention can be incorporated into typical fiber optic link system components housings or packages. Optoelectronic chip 12 is mounted in a cup, 40, with a circular bottom disk and surrounding truncated cylinder sides which can be formed of ceramic, plastic or metal materials. For example, metal TO can bases are often used, or ceramic material cups when hermiticity is required.

Transparent transmission structure 17, containing diffraction grating 18, can be included properly spaced apart from optoelectronic chip 12 by providing it as the package top over the interior of cup 40 to set the value of distance $R_3$. If the completed package from this arrangement is hermetic, transparent transmission structure 17 will be formed of glass and will be brazed to the sides of cup 40. If the completed package need not be hermetic, transparent transmission structure 17 can be formed of glass or plastic and adhered to the sides of cup 40. Lens 14 which collimates or converges the light output from optical emitter 13 is shown on the top surface of chip 12. This chip is electrically connected to the package by wire bonding from the chip to cup 40 lead terminals as shown by wire bonds 41. Electrical leads, 42, through cup 40 to the outside provide for electrical connections to the packaged chip. However, chip 12 could instead be electrically connected to the cup terminals through bump bonding, or the package could be a surface mount type package rather than a leaded package. Most standard electronic device packages can be adapted for housing the transceiver optical portions of the present invention.

Figure 13A:
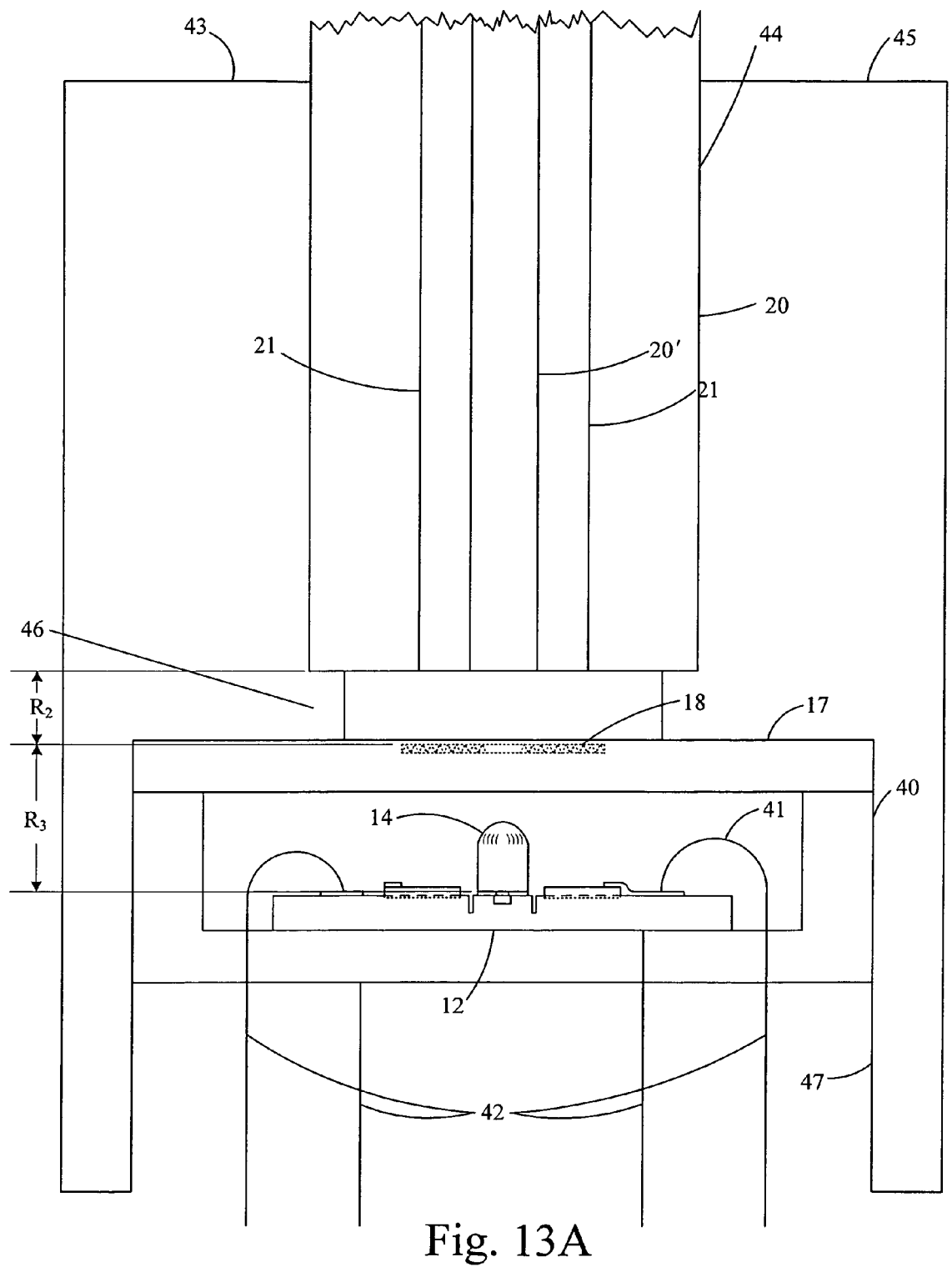
FIGS. 13A and 13B show side and cross section views of a schematic representation of further aspects of the fiber optic link coupler embodiments of FIGS. 6, 7, 8, 9 and 10.
Figure 13B:
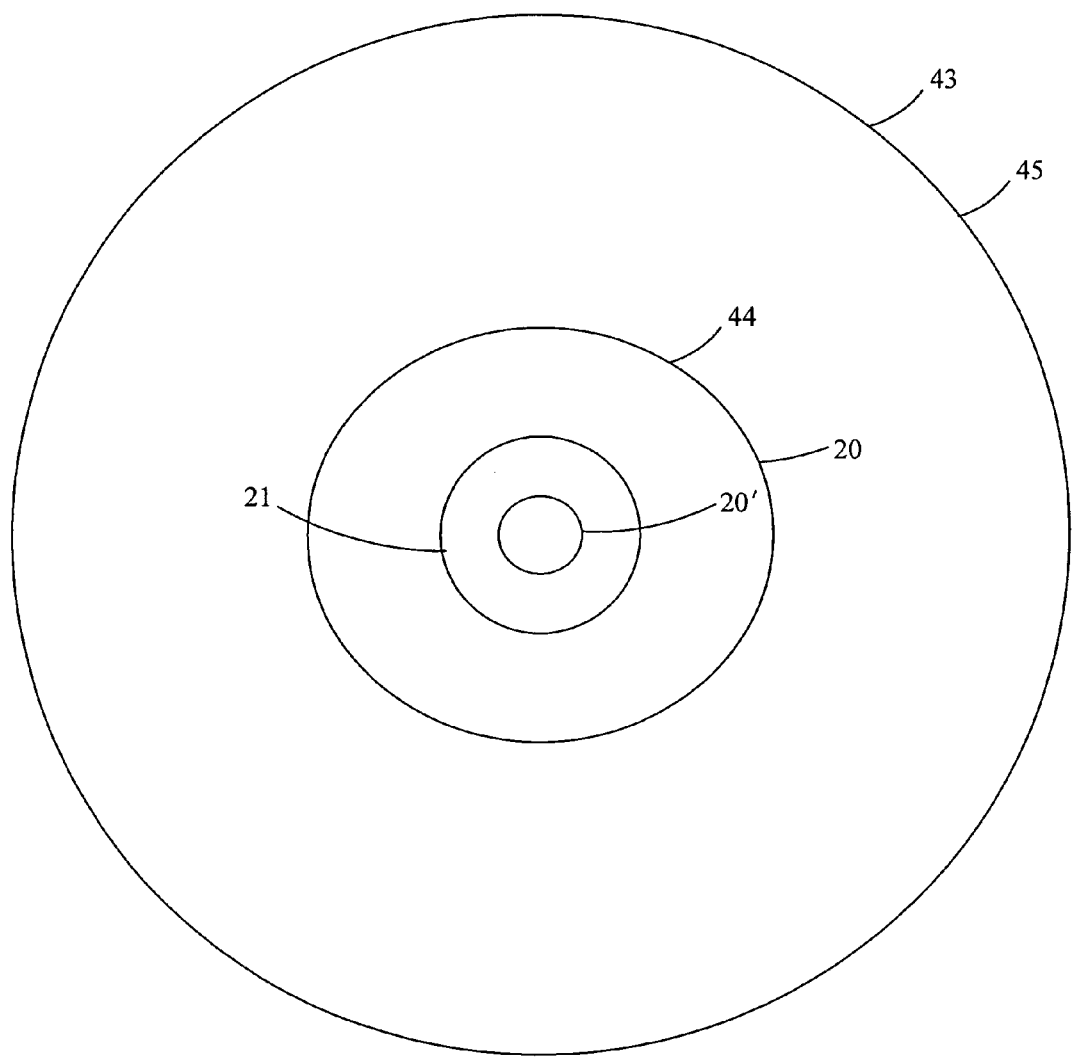

This package including cup 40, transparent transmission structure 17 and the various leads can be inserted into a molded or machined mating structure, 43, that determines the geometrical relationship of the assembled package housing chip 12 and optical fiber 20. In FIG. 13A the side view of this assembly shows that mating structure 43 with a fiber ferrule, 44, inserted therein having an upper truncated cylindrical shell, 45, with its inner diameter matched to the outer diameter of fiber ferrule 44. The end view shown in FIG. 13B is a cross section view showing that these parts are all concentrically arranged with respect to a common central axis. Fiber ferrule 44 holds optical fiber 20 which consists of fiber core 20' and cladding 21. This arrangement allows fiber ferrule 44 to be inserted and removed so as to have optical fiber 20 always located in the same position radially with respect to this central axis.

Mating structure 43 has next in line a middle truncated cylindrical shell, 46, of a smaller inner diameter concentrically joined with the upper shell 45. This middle shell is followed next in line by a lower truncated cylindrical shell, 47, concentrically joined with middle shell 46 with its inner diameter matched to the outer diameter of the package formed by cup 40 and transparent transmission structure 17 so that this package can be held therein. This package can be passively or actively aligned to the axis corresponding to optical fiber core 20'. The length of middle shell 46 provides the proper offset between the end of optical fiber 20 and transparent transmission structure 17, including grating 18, and so sets the value of distance $R_2$.

The present invention facilitates bidirectional optical communication on a single optical fiber by providing efficient coupling of outgoing or output beams 15 of optical emitter 13 into optical fiber 20, efficient coupling of incoming beams 22 from the fiber onto photodetector 11, and a minimal "crosstalk" between these incoming and outgoing beams. In some fiber optic link systems, such as fiber optic sensors, the signals carried by these beams may primarily have low frequencies. However, for others, such as the addition of OTDR capability to a fiber optic data communication link system, the signals may contain high frequencies. For example, if 10 cm resolution is desired in an OTDR signal, (as might be wanted on a network in a military aircraft) pulses of less than 1.0 ns duration must be distinguishable.

This response time requirement typically places limits on the maximum size of the photodetector used which places a further constraint on the optical design of the bidirectional fiber optic link system. As an example, a typical p-i-n GaAs photodiode as the photodetector that is suitable for 1 to 2 Gbps operation might have dimensions of 60 µm×60 µm, or 3600 µm². The total area of the photodetector for the bidirectional fiber optic link system would thus need to be on the same order.

As shown in FIG. 6, light is emitted from optical emitter 13 with a certain divergence. If this device is a VCSEL, the half-angle, $\theta_1$ of this beam is in the range of 5-10°. The diameter $D_1$ of the beam at lens 14 would then be given by $$D_1 = 2 * R_1 * \tan(\theta_1)$$

where $R_1$ is the distance from the surface of emitter 13 to lens 14. As an example, for $R_1$=100 µm, and $\theta_1$=10°, $D_1$=35 µm. If lens 14 collimates or converges entering beam 15, this would be approximately the maximum beam diameter and would be well matched to the input of optical fiber 20, at least for multimode fiber with a core of 50 or 62.5 µm.

On the other hand, the profile of the light exiting optical fiber 20 is determined by the numerical aperture of that fiber. For multimode 50 µm core step-index optical fiber, the numerical aperture ranges from 0.19 to 0.24 depending upon the fiber design. Since numerical aperture is given by $$n \sin \theta_2,$$

where $\theta_2$ is the half-angle of the divergence upon exiting the fiber and n is the fiber index of refraction, this corresponds to a half-angle of divergence ranging from approximately 11 to 14°. For 62.5 µm fiber, the numerical aperture ranges from 0.27 to 0.31, or a divergence half-angle of 15.7 to 18.1°.

Therefore, if $\theta_2$ is the half-angle of the divergence of beam 22 exiting optical fiber 20, and $R_2$ is the distance from the end of the fiber to diffraction grating 18 (or refractive lens 35 in FIG. 8) the beam diameter $D_2$ upon reaching diffraction grating 18 (or refractive lens 35) would be given as $$D_2 = 2 * R_2 * \tan(\theta_2).$$

For a numerical aperture of 0.22 and $R_2$ being approximately 0.5 mm or 500 µm, the beam diameter $D_2$ would be 225 µm. If the numerical aperture was 0.29, and $R_2$=0.5 mm, then $D_2$ would be approximately 304 µm.

The design of diffraction grating 18 (or refractive lens 35) then depends upon the desired dimensions of photodetector 11, i.e. photodetector 11 active sensing area diameters $D_3$ and $D_4$, and the distance $R_3$ from diffraction grating 18 to photodetector 11. The optimum design of photodetector 11 depends upon the efficiency and speed required and is shown in FIG. 7 in a partial ring configuration surrounding optical emitter 13. However, the photodetector could instead be a polygon on one side of the emitter, or more than one polygon on one or more locations around the emitter and electrically connected though not shown or further considered here.

If optical emitter 13 is provided as a VCSEL, then the area of emitting aperture 27 is typically in the range of 5 to 20 µm². An LED emitting region area is more typically 50 µm². High data rate fiber optic communication link systems or one with OTDR capabilities therein are typically the most limiting on dimensions for photodetector 11. For high data rate communications, a VCSEL would be preferred for optical emitter 13. Around emitting aperture 27 several microns are required for metal contact ring 28, and several more for the current confinement structure. Therefore optical emitter 13 might occupy a space which is up to 40 µm in diameter for a VCSEL, and 60 µm or more for an LED. The VCSEL limits the inner diameter $D_3$ of the detecting area of photodetector 11 to being greater than 40 µm. By way of example, assume that this inner diameter of photodetector 11 is 50 µm. If the total area of this detector is constrained to be approximately the same as a 60 µm×60 µm, 1 to 2 Gbps p-i-n photodiode, then the total area is 3600 µm². The perimeter of the photodetector detecting area ring would be approximately 150 µm. The width of that ring would then be approximately 24 µm. This makes the outer diameter $D_4$ of the photodetector detecting area ring equal to approximately 50+24+24=98 µm.

This result provides the design constraints for diffraction grating 18 (or refractive lens 35) as the diameter of incoming beam 22 must be reduced from 225 to 300 μm as found above (depending on the numerical aperture of the fiber) to approximately 100 μm. The most extreme case of the most diverging edge of beam 22 emitted from optical fiber 20 (i.e. on the order of 15° for a multimode fiber) being redirected onto photodetector 11 gives a change in direction of approximately 20°.

Diffraction grating 18 is governed by $$m\lambda = d \sin\theta$$

where m is the diffraction order, λ is the wavelength of light, θ is the diffraction angle, and d is the period of the grating. For a wavelength of 850 nm that is typical of fiber optic data communications, a diffraction angle of 20° as found above, and a diffraction order equal to 1, the grating period will be on the order of 2 to 3 μm. This is a very acceptable grating period for gratings manufactured with standard photolithography techniques.

Thus, the following parameters define an transceiver optical portion system consistent with high data rate fiber optic communication link systems:

Active emitter aperture 27 diameter of a VCSEL: 5-20 μm.

Physical space reserved for optical emitter 13: 40 μm diameter $D_3$=Inner diameter of photodetector 11 ring detecting area: 50 μm $D_4$=Outer diameter of photodetector 11 ring detecting area: 98 μm $R_1$=distance from aperture 27 of optical emitter 13 to lens 14: 100 μm $R_2$=distance from fiber 20 to diffraction grating 18 (or lens 35): 0.5 mm $R_3$=distance from diffraction grating 18 to photodetector 11=1 mm $D_1$=radius of emitter 13 beam 15 as it reaches lens 14=35 μm $D_2$=radius of fiber 20 beam 22 on reaching grating 18=225-300 μm Minimum diffraction grating 18 period to redirect beam 22 onto photodetector 11=2 to 3 μm.

Obviously, a large variety of system arrangements are possible but this example demonstrates the feasibility of transceiver optical portions of the present invention.

Fiber optic link systems involving only relatively low frequency signals, such as sensors, will not have the size of the photodetector therein constrained, and so larger photodetector devices are preferable for reasons of light gathering efficiency. Basing photodetector 11 on silicon material is preferable for reduced costs, but optical emitter 13 must be based upon III-V semiconductor materials such as GaAs or InP. This requirement makes the transceiver optical portion shown in FIG. 9 desirable in which a separate emitter chip is stacked on top of the photodetector chip. The constraint here is the size of the emitter chip, and the desire to have as much of light beam 22 emitted from optical fiber 20 as possible directed to photodetector 11'. A typical minimum size emitter chip would have a side dimension of 250 μm. Depending upon the optical dimensions, no additional directing of beam 22 emitted from fiber 20 maybe necessary. However, diffraction grating 18' (or refractive lens 35) could be used to create an even larger beam divergence so that most of the light misses the emitter chip and is directed onto the photodetector chip.

A more fully integrated version of the transceiver optical portion system is shown in FIG. 10 where diffraction grating 18 and lens 14' for emitter 13 are fabricated on the same transparent transmission structure 17. The advantage here is to allow the alignment between the emitter 13, photodetector 11, emitter lens 14' and grating 18 to be carried out with the wafer fabrication steps and so to be determined by photolithography. This reduces the need for alignment operations when these devices are assembled in a housing or package like that shown in FIG. 13.

FIG. 13 thus also illustrates how the transceiver optical portion system of this invention can be implemented in housings or packaging typically used for optical fiber communications links systems such as TO cans. Optical devices or chips 11, 12, 13, emitter lens 14 and grating 18 are all provided in a package including cup 40, transparent transmission structure 17 and the various leads which is adhered or soldered into mating structure 43. Middle truncated cylindrical shell 46 formed this structure determines the spacing between this package and the end of optical fiber 20. Mating structure 43 also contains upper truncated cylindrical shell 45 to allow fiber 20 in ferrule 44 to be reversibly inserted into this structure.

Figure 14:
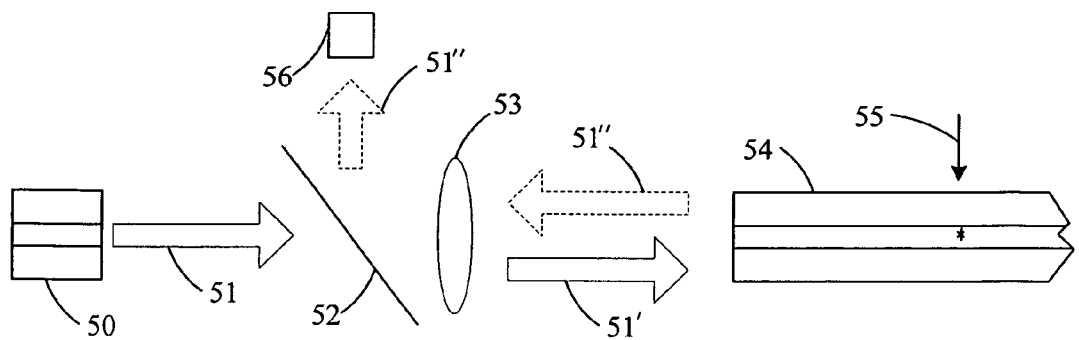
FIG. 14 shows a system schematic diagram of a basic optical time domain reflectometry system.

FIG. 14 shows a basis OTDR system arrangement having a emitter source, 50, supplying an electromagnetic radiation beam, 51, through a beam splitter, 52, and a lens, 53, thereby becoming a transmitted beam, 51', to an optical fiber, 54, with a fault therein at location 55. Return radiation pulse, 51", is reflected from beam splitter 52 into photodetector, 56. Here, the incident OTDR stimulating pulse and return signature are demultiplexed through the use of a beam splitter with power transmission and reflection coefficients of T and R respectively, where R+T=1.

Figure 15:
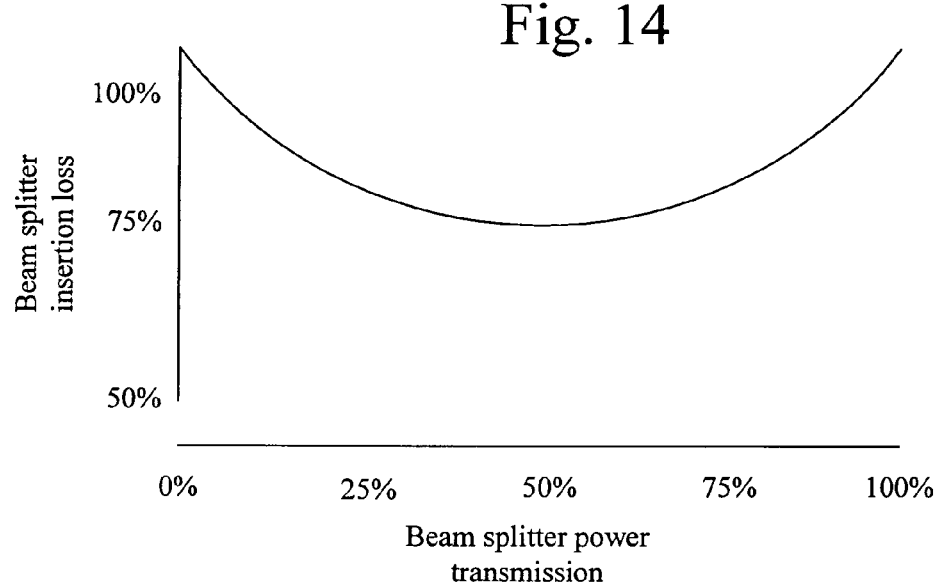
FIG. 15 is a graph showing a plot of component insertion loss versus a component parameter.

Such an approach has several inherent disadvantages: the need for multiple optical components which must be precisely aligned leads to high system component costs and poor mechanical robustness; the need to perform tests offline by "breaking the loop" leads to test-induced faults due to the need to demate sensitive fiber interfaces; and the presence of a beam splitter imposes a minimum insertion loss which leads to a proportionate reduction in sensitivity. FIG. 15 shows a plot of the optical insertion loss induced by the presence of the beam splitter as a function of beam splitter transmission. As can be seen in the figure, there exists an optimum in the transmission at 50%, or 50/50 split ratio, at which point a minimum insertion loss of 75% will be incurred. The described invention addresses many, if not all of the above limitations, by allowing the construction of a compact, robust, low cost OTDR optical subassembly which can, if desired, be incorporated directly into the transceiver front end for online OTDR testing.

Figure 16:
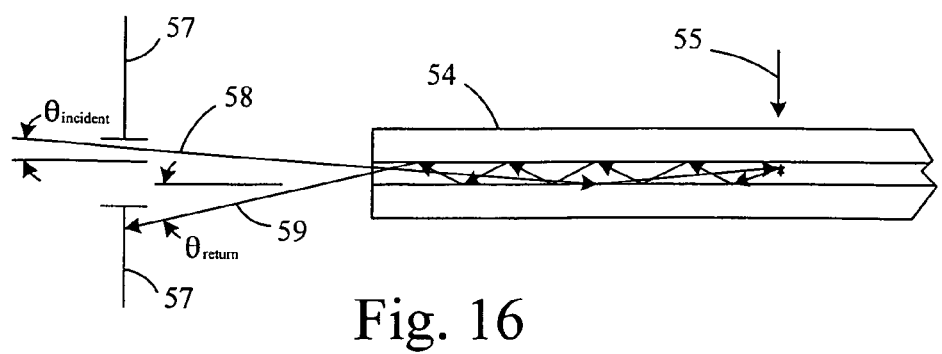
FIG. 16 shows ray entrance geometry at an end of a partial optical fiber representation.

As shown in FIG. 16 with a stop, 57, limiting the angle of rays entering optical fiber 54, low numerical aperture rays, 58, constituting a pulse of optical energy, when controllably launched into a multi-mode fiber at an angle <$\theta_{incident}$ so as to excite predominantly low order modes, will continue if unperturbed to propagate at a relatively low angle with respect to the optical axis of the fiber. Upon encountering a discontinuity in refractive index 55 such as that present at a fiber crack or break, the reflected light rays, 59, of typically higher numerical aperture which couple into the guided modes of the fiber will in all probability have a distinctly different angular distribution than the incident pulse. Such a reflection maybe relatively isotropic or highly directional depending on the nature of the fault. Therefore, the downstream reflected optical energy which has been thus perturbed to have a significant fraction of its energy content propagating in predominantly higher-order (high angle) modes will exit the fiber face at an angle $\theta_{return} < \theta_{incident}$, and as such can be spatially separated by an optical aperture as shown. These rays can then be selectively detected, for instance by the annular detector structure described elsewhere. Therefore, light generated by reflections along the optical path can be measured and characterized as to their cause and point of origin based on their magnitude and time-of-flight.

Figure 17:
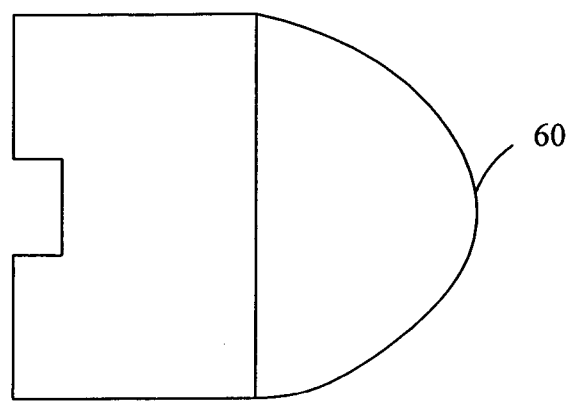
FIG. 17 shows a representation of an optical component embodying the present invention.
Figure 18:
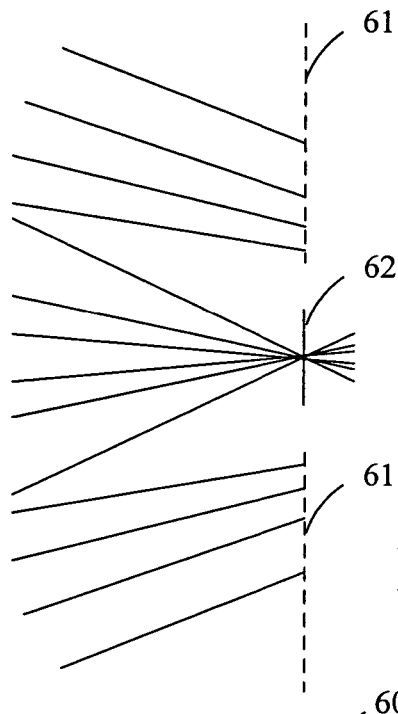
FIG. 18 shows a representation of an optical ray pattern resulting from use an embodiment of the present invention like that in FIG. 17.

In one embodiment, the system would be comprised of a molded bifocal optical element, 60, such as shown in FIG. 17 and an inner and outer region such that the high-angle and low-angle rays will be refracted by different amounts, thus forming two distinct focal planes as can be seen in FIG. 18 for an outer focal plane, 61, and an inner focal plane, 62. The outer cylindrical diameter of the element is 0.09, the diameter of the inset is 0.028, the depth of the inset is 0.0065, the length of the cylinder is 0.0389, and the peak of the rounded surface to the right of the cylinder on the left is 0.0305 from the cylinder (all in inches) thereby forming a lens coupler based on a single plano-convex aspheric optic with a recessed, or inset, region for the low-numerical aperture paraxial rays. The aspheric surface follows $$Z = 1.4e1R^2 + 3.62e3R^4 + 7.17e4R^6 + 3.21e6R^8$$

with the "e's" representing exponentiation multiplying the preceding numbers in powers of ten.

Here, the low-angle rays emanating from the laser or LED source are collimated by the central portion of the lens and coupled into the optical fiber (not shown). Return (OTDR signal) rays from the fiber are spatially separated by the outer region of the lens by its bifocal nature, and coupled onto the detector.

Figure 19:
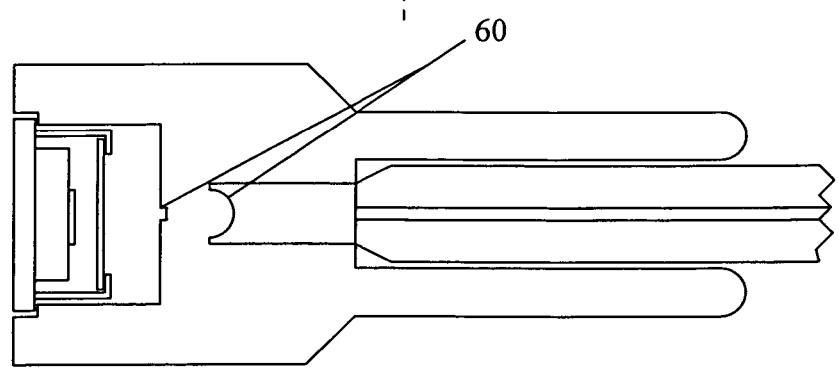
FIG. 19 shows an alternative structure for an optical component embodying the present invention.

The above optical element, when molded into a subassembly with a fiber alignment sleeve and source/detector retention features molded together all in one piece such as shown in FIG. 19 will enable a low cost, mechanically robust, and highly efficient OTDR subassembly.

Some additional advantages of this approach: as described the configuration may be transparent to the various communications protocols: i.e., simultaneous, synchronous, asynchronous, full duplex, and half duplex optical transmission. Other areas of application: could be useful for upstream and downstream data multiplexing in multi-wavelength FTTX (fiber to the X) systems currently using conventional BiDi (BiDirectional) optical subassemblies.

Although the present invention has been described with reference to preferred embodiments, workers skilled in the art will recognize that changes maybe made in form and detail without departing from the spirit and scope of the invention.

The invention claimed is:

1. An optical coupler for conveying optical signals between an optical fiber and one or more optical signaling devices in said optical coupler, said coupler comprising an optical element to (i) direct optical signals from an electromagnetic radiation emitter as a said optical signaling device into an adjacent optical fiber along a transmission axis thereof for transmission through said optical fiber, and to (ii) receive optical signals from said optical fiber after transmission therethrough that are directed by said optical element to propagate away from an extension of said transmission axis past said optical fiber toward said emitter so as to substantially avoid impinging on said emitter, said emitter being provided in an optoelectronic signaling structure at a first portion of an optical signaling device surface in said structure with said structure having a substrate supporting remaining portions thereof, said optical signaling device surface first portion extending substantially laterally in said optoelectronic signaling structure with respect to said transmission axis extension and also having positioned thereabout an extended second portion of said optical signaling device surface at which an electromagnetic radiation detector as an optical signaling device is provided in said optoelectronic structure, said detector extending along at least a nonplanar portion of a peripheral side of said emitter to thereby receive said optical signals from said optical fiber that are directed thereto by said optical element.

2. The coupler of claim 1 wherein said optical element is in an integral structure formed of an optically transmissive material and also comprises a housing structure that can be positioned about at least portions of said emitter and portions of said optical fiber so as to orient said optical signals from said emitter with respect to said optical fiber transmission axis.

3. The coupler of claim 1 wherein said optical element is supported by a housing structure that can be positioned about at least portions of said emitter so as to fix a distance separating said emitter and said optical element.

4. The coupler of claim 1 wherein said emitter and said extended detector are both portions of a monolithic integrated circuit serving as said optoelectronic signaling structure.

5. The coupler of claim 1 wherein said optical element includes an aspheric surface through which said optical signals from said emitter pass in going into said optical fiber and through which optical signals from said optical fiber pass.

6. The coupler of claim 1 wherein said optical element includes an annular diffraction grating to receive said optical signals from said optical fiber.

7. An optical coupler for conveying optical signals between an optical fiber and one or more optical signaling devices in said optical coupler, said coupler comprising an optical element supported therein across from an electromagnetic radiation emitter as an optical signaling device that is supported on a substrate, said optical element to direct optical signals from said electromagnetic radiation emitter into an adjacent optical fiber along a transmission axis thereof for transmission through said optical fiber and includes an annular converging lens to receive optical signals from said optical fiber after transmission therethrough that are directed by said optical element to propagate away from an extension of said transmission axis past said optical fiber toward said emitter so as to substantially avoid impinging on said emitter.

8. The coupler of claim 1 wherein said optical element has an optical lens that is positioned between said emitter and said optical fiber through which said optical signals from said emitter pass in going into said optical fiber but which said optical signals from said optical fiber are directed by said optical element to substantially avoid.

9. The coupler of claim 2 wherein said optical element has a fiber end acceptance opening therein shaped at least in part as a truncated cylinder into which an end of said optical fiber can be positioned to thereby be across from an aspheric surface optical lens formed in said optical element with there being an emitter acceptance opening on an opposite side of said lens into which at least a portion of said emitter can be positioned.

10. The coupler of claim 3 wherein said housing structure and said optical element are provided at least in part in an emitter acceptance opening in a ferrule structure to be across from a fiber acceptance end opening in said ferrule structure into which an end of said optical fiber can be positioned.

11. The coupler of claim 4 wherein said monolithic integrated circuit has an optical lens that is positioned between said emitter and optical element through which said optical signals from said emitter pass in going into said optical fiber but which said optical signals from said optical fiber are directed by said optical element to substantially avoid.

12. An optical coupler for conveying optical signals between an optical fiber and one or more optical signaling devices in said optical coupler, said coupler comprising an optical element to direct optical signals received from said optical fiber to an electromagnetic radiation detector with said optical signals being received by said optical element after having been transmitted through said optical fiber along a transmission axis thereof, said electromagnetic radiation detector being a said optical signaling device supported by a substrate and spaced apart where supported on said substrate from that location on said substrate where intersected by an extension of said optical fiber transmission axis past said optical fiber toward said substrate, said electromagnetic radiation detector being configured to curve over a selected distance along said substrate about said extension of said transmission axis.

13. The coupler of claim 12 wherein said optical element is in an integral structure formed of an optically transmissive material and also comprises a housing structure that can be positioned about at least portions of said optical fiber so as to orient said optical signals from said optical fiber with respect to said detector.

14. The coupler of claim 12 wherein said optical element is supported by a housing structure that can be positioned about at least portions of said detector so as to fix a distance separating said detector and said optical element.

15. The coupler of claim 12 wherein said detector is a portion of a monolithic integrated circuit to thereby receive said optical signals that are directed thereto by said optical element after being received by said optical element from said optical fiber.

16. The coupler of claim 12 wherein said optical element includes an aspheric surface through which said optical signals from said optical fiber pass to reach said detector.

17. The coupler of claim 12 wherein said optical element includes an annular diffraction grating to receive said optical signals from said optical fiber.

18. An optical coupler for conveying optical signals between an optical fiber and one or more optical signaling devices in said optical coupler, said coupler comprising an optical element that includes an annular converging lens to receive said optical signals from said optical fiber and to direct said optical signals from said optical fiber to an electromagnetic radiation detector, said optical signals having been transmitted through said optical fiber along a transmission axis thereof to be received by said optical element, said electromagnetic radiation detector being a said optical signaling device supported by a substrate and spaced apart where supported on said substrate from that location on said substrate where intersected by an extension of said optical fiber transmission axis past said optical fiber toward said substrate.

19. The coupler of claim 13 wherein said optical element has a fiber end acceptance opening therein shaped at least in part as a truncated cylinder into which an end of said optical fiber can be positioned to thereby be across from an aspheric surface optical lens formed in said optical element.

20. The coupler of claim 14 wherein said housing structure and said optical element are provided at least in part in an detector acceptance opening in a ferrule structure to be across from a fiber acceptance end opening in said ferrule structure into which an end of said optical fiber can be positioned.

* * * * *